| United States Patent [19] | [11] | 4,452,715 |
|---|---|---|
| Hirozawa | [45] | Jun. 5, 1984 |

[54] HIGH PH COOLANT CONTAINING CARBONATE ION

[75] Inventor: Stanley T. Hirozawa, Birmingham, Mich.

[73] Assignee: BASF Wyandotte Corporation, Wyandotte, Mich.

[21] Appl. No.: 436,261

[22] Filed: Oct. 25, 1982

[51] Int. Cl.³ .............................................. C09K 15/32
[52] U.S. Cl. ........................................ 252/75; 252/74; 252/77; 252/387; 252/389 R
[58] Field of Search .................... 252/74, 75, 77, 387, 252/389.3, 389.6, 389.62

[56] References Cited

U.S. PATENT DOCUMENTS

| 2,524,484 | 10/1950 | Smith | 252/75 |
|---|---|---|---|
| 3,340,001 | 9/1967 | Thornhill | 252/75 |
| 4,098,720 | 7/1978 | Hwa | 252/387 |
| 4,210,549 | 7/1980 | Hirozawa et al. | 252/75 |
| 4,234,440 | 11/1980 | Hirozawa et al. | 252/75 |

*Primary Examiner*—John E. Kittle
*Assistant Examiner*—Robert A. Wax
*Attorney, Agent, or Firm*—David L. Hedden; Joseph D. Michaels

[57] ABSTRACT pH in the range of 9 to 10.5 can be maintained at elevated temperatures over an extended period by the decarboxylation of bicarbonate or carbonate ion present in a coolant composition free of phosphate and borate compounds.

24 Claims, No Drawings

HIGH PH COOLANT CONTAINING CARBONATE ION

BACKGROUND OF THE INVENTION

1. Field of the Invention

This invention relates to metal corrosion-inhibited aqueous alcohol solutions, particularly antifreeze compositions useful as coolants in a heat exchange system such as the cooling system of an internal combustion engine.

2. Prior Art

It is conventional to utilize a base such as an alkali metal hydroxide, carbonate, and bicarbonate in an amount sufficient to provide an initial pH of about 8.5 to 10 in an aqueous antifreeze composition as disclosed in U.S. Pat. No. 2,815,328. Conventional coolant compositions tend to drift downward in pH during use as the result of the generation of acidic decomposition products.

It is also known to utilize a hydroxybenzoic acid in an antifreeze as a pH buffer from U.S. Pat. Nos. 4,209,415; 4,209,416; 4,210,547; 4,210,548; 4,210,549; and 4,234,440.

The use of water-soluble carbonates, including bicarbonates not only as buffers but also as a means of raising the pH by decarboxylation of said carbonates at elevated temperatures encountered when the cooling compositions are utilized as heat transfer fluids, is novel.

SUMMARY OF THE INVENTION

Water-soluble carbonate including bicarbonate compounds can be utilized to maintain or raise the pH of an aqueous alcohol composition during use as a coolant. The pH of said aqueous alcohol coolant composition can be maintained during exposure to use conditions in the critical alkalinity range of about 9 to about 10.5. Maintenance of the pH of the cooling composition at a high level of about 9 to about 10.5 is especially desirable to inhibit the corrosion of iron and solder and, in addition, is necessary to avoid gelation of water-soluble inorganic silicate corrosion inhibitors used therein as well as decomposition of the required thiazole corrosion inhibitors present in the coolant composition. Alternatively, silicone-silicate copolymers can be substituted for said water-soluble silicate. The use of carbonic acid or a water-soluble carbonate including bicarbonate to maintain pH at about 9 to about 10.5 allows the avoidance of conventional buffers such as phosphate and borate compounds and makes unnecessary the incorporation into the antifreeze of silicones to stabilize said water-soluble inorganic silicate corrosion inhibitor against gelation. Inclusion of other conventional corrosion inhibitors for metals in contact with aqueous liquids is provided to obtain protection for specific types of metals.

DETAILED DESCRIPTION OF THE INVENTION AND THE PREFERRED EMBODIMENTS

It is generally accepted that alcohols utilized in coolant compositons, specifically those used in antifreeze compositions, such as ethylene glycol, are not inherently corrosive toward metals but they become so when degraded to produce acidic compounds by exposure to conditions of use such as elevated temperatures of about 180° F. or above. When the coolant is utilized as a heat transfer medium in an internal combustion engine, exhaust gases and other oxidation products also tend to contaminate the coolant with compounds which are corrosive to metals. The fluid also can be subjected to localized over-heating which tends to accelerate the decomposition process. Thus, corrosive characteristics can be induced in the cooling fluid which become severe enough to cause metal attack unless steps are taken to avoid or repress such action.

It has, therefore, become conventional to employ metal corrosion-inhibiting additives in combination with alcohol-based antifreeze or coolant compositions and a large number of chemical compounds have been suggested for use in such coolant compositions. Many buffer and metal corrosion inhibitor additives have been suggested for use in coolant compositions in order to maintain the pH at a sufficiently high level and/or to prevent corrosion of the metals present in the cooling system. Most of said additives are known to provide only short-lived metal corrosion protection and buffering effectiveness. Their effectiveness is diminished upon exposure to the acidic products generated under the heat and contamination conditions to which the coolant is exposed.

Because of the complex use conditions to which a coolant composition is subjected, determination of the effectiveness of various metal corrosion inhibitor compounds has been difficult without extensive laboratory testing which can be extremely expensive. Recently, it has become possible to more accurately predict the effectiveness of corrosion inhibitors present in aqueous cooling compositions by electrochemical means as indicated in "Mechanism for the Inhibition of Localized Corrosion of Aluminum in Antifreeze Coolants," a paper given by S. T. Hirozawa at the International Corrosion Forum, NACE, Mar. 22–26, 1982, in Houston, Tex. Utilizing such electrochemical means of predicting the effectiveness of metal corrosion inhibitors in aqueous systems, an optimized corrosion inhibitor package has been determined requiring relatively few metal corrosion inhibitors.

Essential to the continued functioning of most metal corrosion inhibitor compositions is the maintenance of the alkalinity of the cooling composition within certain critical limits. The presence of water-soluble carbonates and bicarbonates has been found to provide a pH in the critical alkalinity range when the coolant composition is subjected to actual use conditions over an extended period. The water-soluble carbonates and bicarbonates utilized in the invention are used in a buffering amount to maintain high alkalinity in the coolant composition primarily by their decarboxylation. Decarboxylation occurs during actual use conditions in response to exposure of the coolant composition to high temperatures as it functions as a heat exchange liquid. The carbonates, including bicarbonates, which are water soluble have been found to be useful to maintain the pH of the coolant composition to which they are added at about 9 to about 10.5. Many of the present commercial antifreeze and coolant compositions generally contain phosphate and/or borate compounds as pH buffers. These do not seem useful to maintain the pH in the range of 9 to 10.5, as indicated in the following table.

TABLE I

| Acid | $pK_{a1}$ | $pK_{a2}$ | $pK_{a3}$ | Expected Aqueous Buffer region (pH) |
|---|---|---|---|---|
| Boric | 9.19 | — | — | 8.2–10.2 |
| Phosphoric | 2.15 | 7.2 | 12.36 | 6.2–8.2; 11.4–13.4 |

TABLE I-continued

| Acid | pK$_{a1}$ | pK$_{a2}$ | pK$_{a3}$ | Expected Aqueous Buffer region (pH) |
|---|---|---|---|---|
| Carbonic | 6.36 | 10.33 | — | 5.4–7.4; 9.3–11.3 |

Boric acid is not an effective buffer to maintain the pH in the critical range of 9 to 10.5 in spite of the expected buffer region of 8.2 to 10.2 for boric acid because in an aqueous medium containing an alcohol, such as ethylene glycol, the boric acid esterifies and the ionization constant of the ester increases as compared to aqueous boric acid about 100-fold. Thus, in a 50 percent aqueous solution of ethylene glycol, the pK$_a$ of the boric acid ester is reduced to 7.2 and the useful buffer region in a 50 percent ethylene glycol solution is 6.2 to 8.2.

It will be noted that the buffer zone of phosphoric acid of pH 6.2 to 8.2 is too low to maintain the pH in the critical range of 9 to 10.5 while the phosphoric acid buffer zone of pH 11.4 to 13.4 is too high. At this pH, phosphoric acid has been found to be corrosive toward aluminum and lead.

The buffer zone of carbonic acid, pH 9.3 to 11.3, would maintain the pH of an antifreeze or coolant composition at the critical range of 9 to 10.5 provided some means is present for shifting the buffer zone from the pH 5.4 to 7.4 buffering region. The means for shifting carbonic acid to the higher range buffer region was unexpectedly discovered to be those conditions under which an automobile coolant is ordinarily used, namely, a temperature in the vicinity of the boiling point of water such as normally encountered in a water-cooled internal combustion engine.

The neutralization of carbonic acid by acids (HA) normally produced by the oxidation of glycol upon exposure to the temperature conditions normally encountered by the coolant in a water-cooled internal combustion engine produces the bicarbonate ion in accordance with the following equation (I).

$$CO_3^{--} + HA \rightleftharpoons HCO_3^- + A^- \quad (I)$$

Under the conditions normally encountered in use in an internal combustion engine, the coolant containing carbonate ion produces bicarbonate ion which is easily decarboxylated in accordance with the following equation (II).

$$2HCO_3^- \rightleftharpoons CO_3^{--} + H_2O + CO_2 \uparrow \quad (II)$$

The generation of carbonate ion and water and the loss of carbon dioxide (equation II) under the conditions of use of the coolant composition in an internal combustion engine is considered equivalent to the addition of hydroxide ion to bicarbonate ion as illustrated in equation (III).

$$HCO_3^- - OH^- \rightleftharpoons CO_3^{--} + H_2O \quad (III)$$

Thus the decarboxylation of the bicarbonate ion to produce carbonate ion and water with the loss of carbon dioxide is equivalent to what would occur if hydroxide ion were added to the coolant composition since subsequent to the loss of carbon dioxide in (II), the same reaction products remain. In effect, under use conditions, the undesirable buffer capacity of the carbonate ion in the range of 5.4 to 7.4 is shifted to the pH buffer region of 9.3 to 11.3. The desired pH range of 9 to 10.5 is thus maintained in the coolant composition under the conditions of use.

Useful water-soluble carbonates are the alkali metal carbonates and bicarbonates, sodium, potassium, lithium, cesium carbonate or bicarbonate. Sodium and potassium carbonate and bicarbonate are preferred. Representative useful carbonate and bicarbonate compounds are sodium and potassium carbonate and sodium and potassium bicarbonate. At least one water-soluble carbonate is required. The proportion of water-soluble carbonate, calculated as sodium carbonate or bicarbonate, in the antifreeze coolant solution or the antifreeze concentrate is about 0.2 percent by weight to about 2 percent by weight based upon the weight of the alcohol, preferably about 0.3 percent to about 1.5 percent by weight, and most preferably about 0.35 percent to about 1 percent by weight, all based upon the weight of the alcohol in the antifreeze coolant or antifreeze concentrate composition.

When the metal corrosion inhibitor composition is supplied as an aqueous liquid mixture, the proportion of carbonate or bicarbonate therein is about 4 to about 40 percent by weight. The proportion of water-soluble silicate calculated as sodium metasilicate is about 2 to about 10 percent by weight. The proportion of water-soluble nitrate is about 2 to about 10 percent by weight. The proportion of water-soluble thiazole or triazole is about 1 to about 6 percent by weight and the balance (about 34 percent to about 91 percent by weight) is water, a water-soluble alcohol, or mixtures thereof. Generally, about 1 to about 4 percent by weight of said aqueous liquid mixture is added to 100 parts by weight of the coolant composition to provide metal corrosion resistance. Preferably about 2 to about 3 percent by weight, most preferably about 2.5 to about 2.8 percent by weight is added to 100 parts by weight of the coolant.

When the metal corrosion inhibitor composition of the invention is supplied as a solid mixture, at least some of the following inhibitors, in proportions by weight, are used:

| Metal Corrosion Inhibitor | Parts by weight |
|---|---|
| Water-soluble carbonate | about 55 to about 70 |
| Water-soluble nitrate | about 10 to about 16 |
| Water-soluble silicate | about 12 to about 17 |
| Water-soluble thiazole or | about 8 to about 12 |
| Water-soluble triazole | about 8 to about 12 |

Generally, about 0.1 percent to about 3 percent by weight of said solid metal corrosion inhibitor is added to 100 parts by weight of coolant. Preferably, about 0.2 percent to about 2 percent by weight, most preferably about 0.25 percent to about 0.28 percent by weight, is added to 100 parts by weight of coolant.

The water-soluble inorganic silicates, which are useful especially in the corrosion protection of iron and aluminum, can be represented by the average formula:

$$\left(\frac{M_2O}{a}\right)(SiO_2)_n$$

wherein n has a value from 0.5 to 4, preferably from 1.0 to 2.5 and wherein M is a cation that forms a water-soluble silicate and a is the valence of the cation represented by M and has a value of at least 1. Illustrative of these silicates are the alkali metal orthosilicates wherein M is an alkali metal and n is 1, the alkali metal metasilicates, the alkali metal tetrasilicates, the alkali metal disilicates, and the tetra(organo) ammonium silicates. Specific examples of these silicates are potassium metasilicate, sodium orthosilicate, potassium disilicate, lithium orthosilicate, lithium metasilicate, lithium disilicate, rubidium disilicate, rubidium tetrasilicate, tetra(methyl) ammonium silicate, tetra(ethyl) ammonium silicate, phenyltrimethyl ammonium silicate, benzyltrimethyl ammonium silicate, guanidine silicate, and tetra(hydroxyethyl)ammonium silicate. The preferred silicates are sodium and potassium silicates, especially sodium metasilicate and potassium metasilicate. Particularly desirable are the commercially available sodium silicate aqueous solutions containing a weight ratio of silicon dioxide to sodium oxide of 1.8:1, 2.5:1, and 3.22:1.

Said silicate is incorporated into the coolant and antifreeze concentrate compositions of the invention in a metal corrosion inhibiting amount, generally in the proportion of about 0.1 percent by weight to about 0.5 percent by weight based upon the weight of the water-soluble alcohol component of the composition. Preferably, a proportion of about 0.2 percent by weight to about 0.4 percent by weight, most preferably about 0.25 percent by weight to about 0.35 percent by weight, all based upon the weight of the water-soluble alcohol component used.

To provide for the corrosion protection of copper, brass and solder, the coolant compositions of the invention contain in a corrosion inhibiting amount at least one water-soluble salt of a triazole or thiazole compound. Representative useful thiazoles include the alkali metal salts such as the sodium, potassium, lithium, rubidium, and cesium salts of thiazoles such as mercaptobenzothiazole, 4-phenyl-2-mercaptobenzothiazole, 4-methyl-2-mercaptobenzothiazole, and 5-methyl-2-mercaptobenzothiazole. Representative useful triazoles include the alkali metal salts of mercaptobenzotriazole, benzotriazole, tolyltriazole, benzotriazole carboxylic acid; alkyl esters of benzotriazole carboxylic acid having 1 to 8 carbon atoms in the alkyl group such as the methyl and butyl esters thereof; and benzotriazole derivatives having various substituents on the aromatic ring, i.e., $NO_2$, Cl, and $NH_2$.

At least one thiazole or triazole compound can be incorporated into the aqueous coolant or antifreeze concentrate composition or into the corrosion inhibiting composition intended for subsequent addition to the cooling system of an internal combustion system in the acid form of the thiazole or triazole. In the resulting alkaline solution of the coolant or antifreeze concentrate or corrosion inhibiting composition, the acid form is converted to the salt which is water soluble. The thiazole or triazole, calculated as the sodium salt, is incorporated into the coolant solution and the antifreeze concentrate generally in the proportion of about 0.1 percent by weight to about 0.5 percent by weight based upon the weight of the water-soluble alcohol component of each composition. Preferably, the proportion of thiazole or triazole is about 0.2 percent to about 0.4 percent by weight and most preferably about 0.25 percent to about 3 percent by weight, all based upon the weight of the water-soluble alcohol component utilized. The percent by weight of the thiazole or triazole is calculated so as to provide an equivalent ion concentration as would be provided by sodium mercaptobenzothiazole with respect to the thiazole compounds and sodium tolyltriazole with respect to the triazole compounds.

The water-soluble nitrate, which is used in a corrosion inhibiting amount to provide specific corrosion protection of aluminum, can be derived from any inorganic nitrate compound which is capable of ionization to provide nitrate ions in sufficient concentration to passivate an aluminum or aluminum alloy surface. The water-soluble nitrate can be derived from nitric acid, ammonium nitrate or an alkali metal or alkaline earth metal nitrate. Preferably, the water-soluble nitrate is an alkali metal nitrate. It is possible to add nitric acid to the aqueous liquid and subsequently add an alkali or alkaline earth metal hydroxide to neutralize the nitric acid and obtain an aqueous solution having a pH in the desired alkaline pH range. Useful water-soluble nitrate salts are sodium nitrate, potassium nitrate, lithium nitrate, cesium nitrate, rubidium nitrate, calcium nitrate, strontium nitrate, magnesium nitrate, beryllium nitrate, zinc nitrate, and cadmium nitrate. Preferably sodium or potassium nitrate is utilized.

The proportion of nitrate ion utilized, calculated as sodium nitrate, is about 0.2 to about 0.5 percent by weight based upon the weight of the alcohol utilized in the coolant solution or antifreeze concentrate of the invention. Preferably about 0.25 percent to about 0.4 percent by weight and most preferably about 0.3 percent to about 0.35 percent by weight of nitrate ion calculated as sodium nitrate is utilized all based upon the weight of said alcohol. Where a corrosion inhibiting aqueous liquid composition is prepared free of alcohol for subsequent addition to a cooling system containing alcohol, an equal amount of nitrate ion calculated as sodium nitrate is utilized in comparison with the proportion by weight of a water-soluble silicate.

A water-soluble nitrite can be included optionally in the coolant compositions, antifreeze concentrates and metal corrosion inhibiting compositions of the invention as a specific corrosion inhibitor for cast iron and mild steel in contact with an aqueous liquid. Preferably, the water-soluble nitrites are alkali metal nitrites such as those illustrated by the potassium and sodium nitrites. These corrosion inhibitors can be utilized generally in the antifreeze concentrates and coolant compositions of the invention in a proportion of about 0.05 percent by weight to about 0.2 percent by weight based upon the weight of the alcohol component of the coolant and antifreeze concentrate of the invention. Preferably about 0.1 percent to about 0.15 percent by weight, and most preferably about 0.12 percent to about 0.14 percent by weight, of nitrite ion calculated as sodium nitrite, all based upon the weight of said alcohol, can be used.

Similarly, dodecane dioic acid and sebacic acid or the water-soluble salts thereof, preferably the alkali metal salts thereof, can be used optionally in the coolant, antifreeze concentrates, and metal corrosion inhibitor aqueous liquid or solid compositions of the invention. These inhibitors provide specific corrosion protection against the effect of continuous impingement of said or other particulates present in the coolant composition. Preferably, these inhibitors are present in the antifreeze concentrates, coolants, and liquid inhibitor compositions of the invention as the alkali metal salts and are used generally in said concentrates and coolants (calculated as the sodium salts) in the proportion of about 0.5 percent to about 3 percent by weight, preferably about 1 percent by weight to about 2 percent by weight, all based upon the weight of the water-soluble alcohol. In the liquid or solid metal corrosion inhibitor compositions of the invention, the proportions of these inhibitors, calculated as the sodium salts, are comparable to the proportions of silicate calculated as sodium metasilicate, i.e., about 2 to about 10 percent by weight in the aqueous liquid metal corrosion inhibitor composition and about 11 to about 17 parts by weight in the solid metal corrosion inhibitor composition.

The aqueous antifreeze coolants and concentrates for use in the cooling systems of internal combustion engines generally utilize at least one water-soluble alcohol which is defined to include both monohydric alcohols (such as methanol, ethanol, and propanol) and polyhydric alcohols (such as ethylene glycol, dipropylene glycol, propylene glycol, diethylene glycol, triethylene glycol, and glycerol). The alcohol can also include hydrocarbon alcohols and alcohols containing ether linkages. Mixtures of alcohols are also useful in the compositions of this invention. In view of its desirable physical properties such as its low molecular weight and its low volatility, ethylene glycol is an especially useful alcohol in these compositions and mixtures of ethylene glycol and diethylene glycol are preferred. Especially preferred are mixtures of about 80 percent to about 98 percent ethylene glycol and 2 percent to about 20 percent diethylene glycol, all by weight and based upon the total weight of the antifreeze concentrate.

The compositions of this invention which are free of phosphate and borate compounds, include (1) antifreeze coolants composed mainly of water, (2) antifreeze concentrates containing relatively small amounts of water and consisting mainly of at least one water-soluble alcohol and corrosion inhibitors, and (3) liquid or solid mixed metal corrosion inhibitor compositions adapted for addition to a heat transfer fluid, for instance, to the cooling system of an internal combustion engine. The antifreeze concentrates are adapted for economical shipment and storage, and the antifreeze coolants of the invention are adapted to use as such as heat-transfer media in the cooling systems of water-cooled internal combustion engines. In practice, the antifreeze concentrates can be shipped to the point of use whereupon they can be diluted with water to form the coolant composition. The metal corrosion inhibitor liquid compositions can be advantageously supplied in a concentrated aqueous composition adapted to provide unit dosage for use in heat transfer fluids.

The antifreeze coolant compositions of the invention can contain from 100 parts by weight to 800 parts by weight of water per 100 parts by weight of a water-soluble alcohol, preferably a glycol. Preferably, the coolant compositions of the invention contain from about 100 to about 300 parts by weight of water per 100 parts by weight of the water-soluble alcohol. The relative amount of water and alcohol in the antifreeze coolant compositions can be varied to raise or lower the freezing point of the compositions in the desired amount. The antifreeze concentrates of the invention can contain from 0.1 percent to about 10 percent by weight of water per 100 parts by weight of water-soluble alcohol, preferably the antifreeze concentrates contain about 2 percent to about 5 percent by weight of water per 100 parts by weight of the water-soluble alcohol.

If desired, various metal corrosion and noncorrosion inhibiting additives can be added to the antifreeze compositions of the invention. The antifreeze concentrates, coolants and liquid or dry metal corrosion inhibitor compositions are free of phosphate and borate salts. Other conventional metal corrosion inhibitors, such as water-soluble molybdates and benzoates, particularly the alkali metal salts thereof, can be used for their known metal corrosion inhibiting effects. For example, antifoam agents, identifying dyes, pH indicators, sealants which prevent leakage of the coolant from the cooling system, anticreep agents which prevent seepage of the coolant into the crankcase of the internal combustion engine, and the like, can be added to the heat-transfer compositions of the invention.

The corrosion inhibited heat transfer compositions of this invention can be prepared in any convenient manner by adding at ambient temperature and pressure the required metal corrosion inhibitors to water optionally containing a water-soluble alcohol and various conventional additives for imparting special properties to the heat-transfer medium. The mixed liquid or solid metal corrosion inhibitor compositions can be prepared simply by combining dry or liquid forms of the components and mixing at ambient temperature and pressure until a uniform dry mixture or aqueous solution or dispersion of the components is obtained.

Instead of a water-soluble silicate as a component of the antifreeze concentrates, antifreeze coolants, and mixed liquid metal corrosion inhibiting compositions, a silicone-silicate copolymer can be substituted therefor. It is well known in the prior art that water-soluble silicone-silicate copolymers are substantially more resistant to gelation than aqueous solutions of a water-soluble silicate at a pH between 7 and 9. While it is believed that the antifreeze concentrate and antifreeze coolant compositions of the invention containing a water-soluble silicate are sufficiently stable under the conditions of use when the pH of the aqueous liquid is maintained at about 9 to about 10.5, it is additionally advantageous to prepare antifreeze concentrates and antifreeze coolant compositions utilizing silicone-silicate copolymers rather than water-soluble silicates so as to obtain additional protection against silicate instability. The high pH antifreeze concentrates and antifreeze coolant compositions of the invention, when made utilizing silicone-silicate copolymers rather than alkali metal silicates, provide desirable corrosion protection for iron and solder not obtainable at lower pH values.

Various siloxanes and their use in the formation of copolymers with water-soluble silicates are disclosed in the prior art. Siloxanes useful in the preparation of the silicone-silicate copolymers useful in the present invention are disclosed in the following U.S. Patents:

U.S. Patent List

U.S. Pat. Nos. 3,234,144, 3,203,969, 3,341,469, 3,337,496, 3,198,820, 3,312,622, 3,248,329, 3,265,623, and 3,121,692.

Each of these patents are incorporated herein by reference. Representative classes of silicones and siloxanes which are disclosed in the above prior art U.S. Patents are as follows: carboxysiloxane metal salts, amino silicones, organosiloxanes such as methylsiloxy, ethylsiloxy, phenylsiloxy, and vinylsiloxy siloxanes.

Recently in U.S. Pat. Nos. 4,287,077 and 4,333,843, ether-modified silicones and organophosphorous-silicon compounds have been disclosed as useful in the prevention of the gelation of water-soluble silicates utilized in aqueous antifreeze compositions as metal corrosion inhibitors. The gelation resistance of the water-soluble silicate is enhanced by the addition of an effective amount of either the ether-modified silicone or the organophosphorus-silicon compounds disclosed in these patents. The use of such silicone compositions to improve gelation stability of water-soluble silicates is useful in the compositions of the present invention. In addition, a process for the preparation of phosphonate functional silicones is disclosed in U.S. Pat. No. 4,093,461 and their use in antifreeze concentrates and coolant compositions is disclosed as a means of improving the gelation stability of water-soluble silicates in German Pat. DT No. 2912430, which corresponds to pending United States application Ser. No. 891,584, filed Mar. 30, 1978. Each of the patents listed above are incorporated herein by reference. A useful phosphonate functional siloxane is the propylphosphonate siloxane.

Useful silicone-silicate copolymers can also be prepared utilizing sulfonate siloxanes which have been disclosed in the prior art in U.S. Pat. Nos. 3,507,897, 2,968,643, and 3,215,643 and in pending U.S. patent application Ser. Nos. 250,087, 249,916, and 250,050, all filed Apr. 1, 1981. Each of the above-listed patents are incorporated herein by reference. Representative silicone sulfonates are the hydroxy-substituted aliphatic silicone sulfonates disclosed by Kanner et al in U.S. Pat. No. 3,507,897 and the sulfo-arylalkyl siloxanes and salts thereof disclosed by Bailey in U.S. Pat. No. 2,968,643, each incorporated by reference.

In preparing the silicone-silicate copolymers useful in the antifreeze concentrates and coolants compositions of the invention, the starting water-soluble silicate can be added to the reaction mixture as such or it can be formed in situ by the addition of an appropriate hydroxide, for instance, sodium or potassium hydroxide, and silica to the reaction mixture. Thereafter, any of the silicones or siloxanes disclosed in the above prior art patents or pending U.S. Patent applications can be added to the reaction mixture. The temperature at which the siloxane and silicate are maintained for 15 minutes to 3 hours in the reaction mixture to produce the copolymers useful in the present invention can vary widely. Temperatures from 20° C. to 150° C. at ambient pressures can be used. However, temperatures from 20° C. to 115° C. are preferred. The use of other temperatures or pressure is generally undesirable since no advantage is gained thereby. The silicone-silicate copolymers useful in the present invention contain from 0.1 to 99.9 parts by weight of at least one silicate group member derived from a water-soluble silicate. The remainder of the copolymer is the silicone group member. Preferably the copolymers of the invention contain about 5 to about 45 parts by weight of silicone and about 55 to about 95 parts by weight of silicate groups, and most preferably, about 15 to about 25 parts by weight of silicone groups and about 75 parts by weight to about 85 parts by weight of silicate groups, all based upon 100 parts by weight of said copolymers.

The silicates useful in the formation of the copolymer include water-soluble orthosilicates, metasilicates, tetrasilicates, disilicates, and tetraoganoammonium silicates. The preferred silicates for the formation of the copolymer are sodium and potassium silicate, especially sodium metasilicate and potassium metasilicate.

The proportion of silicone-silicate copolymer useful as a component of the antifreeze concentrate and coolant compositions of the invention is about 0.1 percent to about 0.5 percent by weight, preferably about 0.2 to about 0.4 percent by weight, and most preferably about 0.25 to about 0.35 percent by weight, all based upon the weight of the alcohol component of said antifreeze concentrate or coolant composition. With respect to the aqueous liquid metal corrosion inhibitor mixed composition of the invention, about 2 to about 10 percent by weight, preferably about 1 to about 5 percent by weight of said copolymer is utilized, based upon the total weight of the liquid metal corrosion inhibiting composition. In the solid corrosion inhibitor mixed composition, about 11 to about 17 parts by weight of silicone-silicate is used based upon the total weight of said mixed composition.

Many metal corrosion-inhibiting compositions can be prepared in accordance with the teachings of the invention. The following compositions are, therefore, merely representative. Where not otherwise specified throughout this specification and claims, temperatures are given in degrees centigrade and parts, percentages, and proportions are by weight.

EXAMPLES 1-6

The antifreeze concentrates shown in Table II are prepared by mixing the ingredients at ambient temperature and pressure. Examples 1, 2, and 4 were evaluated using ASTM-D 2809 standard test procedure for pump cavitation corrosion. Passing in this test is a rating of 8 out of a best possible rating of 10, on a scale of 1-10, after 100 hours of exposure. The test was extended to about 1000 hours and the antifreeze compositions rated again. Test results are shown in Table III.

TABLE II

| Ingredients | Antifreeze Concentrates (parts by weight) | | | | | |
|---|---|---|---|---|---|---|
| | Example 1 | Example 2 | Example 3 | Example 4 | Example 5 | Example 6 |
| Ethylene glycol | 98.86 | 88.7 | 88.7 | 88.1 | 88.7 | 88.7 |
| Diethylene glycol | 2.5 | 4.7 | 4.7 | 4.6 | 4.7 | 4.7 |
| Water | 2.5 | 2.5 | 2.5 | 2.0 | 2.5 | 2.5 |
| $NaNO_3$ | 0.3 | 0.3 | 0.3 | 0.3 | 0.3 | 0.3 |
| $Na_2CO_3$ | 1.0 | 2.0 | 0.5 | 2.0 | 2.0 | 0.5 |
| $Na_2SiO_3.5H_2O$ | 0.3 | 0.3 | 0.3 | — | — | — |
| $Na_2O(SiO_2)_{1.8}$(37%) | — | — | — | 0.5 | 0.5 | 0.5 |
| β(Na sulfophenyl)ethyl siloxane | 0.1 | 0.1 | 0.1 | — | — | — |
| Na mercaptobenzothiazole | 0.25 | 0.25 | 0.25 | 0.25 | 0.25 | 0.25 |
| Dodecane dioic acid | 2.0 | — | — | 2.0 | — | — |
| Na sebacate | — | 2.0 | 2.0 | — | 2.0 | 2.0 |
| Defoamer, PLURONIC ® L61 | 0.03 | 0.03 | 0.03 | 0.3 | — | — |
| $Na_2MoO_4.2H_2O$ | 0.01 | 0.01 | 0.01 | — | — | — |

TABLE III

| | Pump Cavitation Corrosion - ASTM-D2809 Scale 1-10; 10 is best | | | |
|---|---|---|---|---|
| Duration (hours) | Example 1 | Example 2 | Example 3 | Example 4 |
| 100 | 10 | 10 | — | 10 |
| 995 | 7 | — | — | — |
| 1009 | — | 8 | 7.5 | — |
| 1015 | — | — | — | 9 |

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purpose of illustration which do not constitute departure from the spirit and scope of the invention.

The embodiments of the invention in which an exclusive property or priviledge is claimed are defined as follows:

1. An antifreeze concentrate free of phosphate, borate, and silicone compounds having a pH of about 9 to about 10.5 comprising at least one water-soluble alcohol, and a metal corrosion inhibitor composition comprising metal corrosion inhibiting amounts of at least one water-soluble inorganic silicate, at least one water-soluble nitrate, at least one water-soluble triazole or thiazole, and about 0.2 percent to about 2 percent by weight of at least one water-soluble carbonate based upon the weight of said water-soluble alcohol.

2. The antifreeze concentrate composition of claim 1 wherein said water-soluble silicate is present in the amount of about 0.1 percent to about 0.5 percent by weight based upon the weight of said water-soluble alcohol.

3. The antifreeze concentrate composition of claim 1 wherein said water-soluble alcohol comprises a mixture of ethylene glycol and diethylene glycol, and said triazole and thiazole are selected from the group consisting of mercaptobenzothiazole, tolyltriazole, and the alkali metal salts thereof.

4. The antifreeze concentrate composition of claim 3 wherein said antifreeze concentrate comprises in percent by weight:
   A. a glycol component: ethylene glycol, about 80 to about 98 percent; diethylene glycol, about 2 percent to about 20 percent, all based upon the total weight of said concentrate;
   B. an aqueous component: water, about 0.1 to about 10 percent all based upon the total weight of said concentrate;
   C. a metal corrosion inhibitor and buffer component:
      an alkali metal carbonate or bicarbonate, about 0.2 to about 2 percent;
      an alkali metal nitrate, about 0.2 to about 0.5 percent;
      an alkali metal salt of mercaptobenzothiazole, about 0.1 to about 0.5 percent;
      an alkali metal salt of tolyltriazole, about 0.05 percent to about 0.3 percent;
      an alkali metal silicate, about 0.1 to about 0.5 percent, all said inhibitor components being based upon the weight of said glycol component.

5. A metal corrosion inhibiting mixed liquid composition for use in aqueous liquids in contact with metals consisting of, in percentages by weight, about 2 percent to about 10 percent of a water-soluble silicate, about 2 to about 10 percent of a water-soluble nitrate, about 1 percent to about 6 percent of at least one of mercaptobenzothiazole, tolyltriazole and the alkali metal salts thereof, about 4 percent to about 40 percent of a water-soluble carbonate, and the balance water.

6. An aqueous coolant composition consisting of the composition of claim 5 and a water-soluble alcohol wherein said water-soluble carbonate is an alkali metal carbonate or bicarbonate.

7. A metal corrosion inhibiting, solid mixed composition for use in aqueous liquids in contact with metals, said mixed composition consisting of at least one of each of the following inhibitors: about 55 to about 70 parts by weight of a water-soluble carbonate, about 10 to about 16 parts by weight of a water-soluble nitrate, about 12 to about 17 parts by weight of a water-soluble silicate, and about 8 to about 12 parts by weight of a water-soluble thiazole or triazole.

8. An aqueous coolant composition consisting of the composition of claim 7 and a water-soluble alcohol wherein said water-soluble carbonate is an alkali metal carbonate or bicarbonate.

9. An antifreeze coolant composition free of phosphate, borate, and silicone compounds comprising water, at least one water-soluble alcohol and a metal corrosion inhibitor composition comprising the following inhibitors in percentages by weight:
   about 0.1 percent to about 0.5 percent of an alkali metal silicate;
   about 0.2 percent to about 0.5 percent of an alkali metal nitrate;
   about 0.1 percent to about 0.5 percent of at least one of mercaptobenzothiazole, tolyltriazole and the alkali metal salts thereof;
said composition being maintained during use at elevated temperatures at a pH of about 9 to about 10.5 with about 0.2 percent to about 2 percent of a water-soluble carbonate.

10. The antifreeze coolant composition of claim 9 wherein said water-soluble alcohol is selected from the group consisting of at least one of ethanol, methanol, propanol, triethylene glycol, glycerol, ethylene glycol, diethylene glycol, and dipropylene glycol and said water-soluble carbonate is an alkali metal carbonate or bicarbonate.

11. In a process for inhibiting the corrosion of metals that come in contact with an aqueous antifreeze or coolant composition, the improvement wherein said antifreeze or coolant composition is free of phosphate, borate, and silicone compounds and comprises a mixture of water and an antifreeze or coolant concentrate comprising at least one water-soluble alcohol, metal corrosion inhibiting amounts of at least one water-soluble silicate, a water-soluble nitrate, and at least one of mercaptobenzothiazole, tolyltriazole or the water soluble salts thereof, and a pH buffering amount of at least one water-soluble carbonate wherein said alcohol is selected from the group consisting of methanol, ethanol, propanol, ethylene glycol, diethylene glycol, dipropylene glycol, triethylene glycol, glycerol, and mixtures thereof, and wherein said water-soluble silicate is an alkali metal silicate.

12. The process of claim 11 wherein said water-soluble alcohol is a mixture of diethylene glycol and ethylene glycol, said water-soluble nitrate is an alkali metal nitrate, and said water-soluble carbonate is an alkali metal carbonate or bicarbonate.

13. An antifreeze concentrate free of phosphate and borate compounds having a pH of about 9 to about 10.5 comprising at least one water-soluble alcohol and a metal corrosion inhibitor composition comprising metal corrosion inhibiting amounts of at least one water-soluble silicone-silicate copolymer, at least one water-soluble nitrate, at least one water-soluble triazole or thiazole, and about 0.2 percent to about 2 percent by weight of at least one water-soluble carbonate based upon the weight of said water-soluble alcohol.

14. The antifreeze concentrate composition of claim 13 wherein said water-soluble silicone-silicate copolymer is present in the amount of about 0.1 percent to about 0.5 percent by weight based upon the weight of said water-soluble alcohol.

15. The antifreeze concentrate composition of claim 14 wherein said water-soluble alcohol comprises a mixture of ethylene glycol and diethylene glycol, and said triazole and thiazole are selected from the group consisting of mercaptobenzothiazole, tolyltriazole, and the alkali metal salts thereof.

16. The antifreeze concentrate composition of claim 15 wherein said antifreeze concentrate comprises in percent by weight:
  A. a glycol component: ethylene glycol, about 80 to about 98 percent; diethylene glycol, about 2 percent to about 20 percent, all based upon the total weight of said concentrate;
  B. an aqueous component: water, about 0.1 to about 10 percent;
  C. a metal corrosion inhibitor and buffer component: an alkali metal carbonate or bicarbonate, about 0.2 to about 2 percent;
  an alkali metal nitrate, about 0.2 to about 0.5 percent;
  an alkali metal salt of mercaptobenzothiazole, about 0.1 to about 0.5 percent; an alkali metal salt of tolyltriazole, about 0.05 percent to about 0.3 percent; and
  an alkali metal silicone-silicate copolymer, about 0.1 to about 0.5 percent, all said inhibitor components being based upon the weight of said glycol component.

17. A metal corrosion inhibiting mixed liquid composition for use in aqueous liquids in contact with metals consisting of, in percentages by weight, about 2 percent to about 10 percent of a water-soluble silicone-silicate copolymer, about 2 percent to about 10 percent of a water-soluble nitrate, about 1 percent to about 6 percent by weight of at least one of mercaptobenzothiazole, tolyltriazole and the alkali metal salts thereof, about 4 percent to about 40 percent of a water-soluble carbonate, and the balance water.

18. An aqueous coolant composition consisting of the composition of claim 17 and a water-soluble alcohol wherein said water-soluble carbonate is an alkali metal carbonate or bicarbonate.

19. A metal corrosion inhibiting composition for use in aqueous liquids in contact with metals, said composition comprising about 55 to about 70 parts by weight of a water-soluble carbonate, about 10 to about 16 parts by weight of a water-soluble nitrate, about 12 to about 17 parts by weight of a water-soluble silicone-silicate copolymer, and about 8 to about 12 parts by weight of a water-soluble thiazole or triazole.

20. An aqueous coolant composition comprising the composition of claim 19 and a water-soluble alcohol wherein said water-soluble carbonate is an alkali metal carbonate or bicarbonate.

21. An antifreeze coolant composition free of phosphate and borate compounds comprising a water-soluble alcohol and a metal corrosion inhibitor composition comprising in percentages by weight:
  about 0.1 percent to about 0.5 percent of an alkali metal silicone-silicate copolymer;
  about 0.2 percent to about 0.5 percent of an alkali metal nitrate;
  about 0.1 percent to about 0.5 percent of at least one of mercaptobenzothiazole, tolyltriazole and the alkali metal salts thereof;
said composition being maintained during use at elevated temperatures at a pH of about 9 to about 10.5 with about 0.2 percent to about 2 percent of a water-soluble carbonate.

22. The antifreeze coolant composition of claim 21 wherein said water-soluble alcohol is selected from the group consisting of at least one of ethanol, methanol, propanol, triethylene glycol, diethylene glycol, glycerol, ethylene glycol, and dipropylene glycol and said water-soluble carbonate is an alkali metal carbonate or bicarbonate.

23. In a process for inhibiting the corrosion of metals that come in contact with an aqueous antifreeze or coolant composition, the improvement wherein said antifreeze or coolant composition is free of phosphate and borate compounds and comprises a mixture of water and an antifreeze or coolant concentrate comprising at least one water-soluble alcohol, metal corrosion inhibiting amounts of at least one water-soluble silicone-silicate copolymer, at least one water-soluble nitrate, and at least one of mercaptobenzothiazole, tolyltriazole or the water soluble salts thereof, and a buffering amount of at least one water-soluble carbonate wherein said alcohol is selected from the group consisting of methanol, ethanol, propanol, ethylene glycol, diethylene glycol, triethylene glycol, dipropylene glycol, glycerol and mixtures thereof, and wherein said water-soluble silicone-silicate copolymer is an alkali metal salt thereof.

24. The process of claim 23 wherein said water-soluble alcohol is a mixture of diethylene glycol and ethylene glycol, said water-soluble nitrate is an alkali metal nitrate and said water-soluble carbonate is an alkali metal carbonate or bicarbonate.

* * * * *